United States Patent
Eun et al.

(10) Patent No.: US 8,913,957 B2
(45) Date of Patent: Dec. 16, 2014

(54) WIRELESS LOCAL AREA COMMUNICATION METHOD AND TERMINAL SUPPORTING THE SAME

(75) Inventors: Dong Jin Eun, Seoul (KR); Yeo-Jun Yoon, Suwon-si (KR); Seong Hoon Kang, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 188 days.

(21) Appl. No.: 13/368,806

(22) Filed: Feb. 8, 2012

(65) Prior Publication Data

US 2012/0322379 A1   Dec. 20, 2012

(30) Foreign Application Priority Data

Jun. 14, 2011  (KR) .................. 10-2011-0057211

(51) Int. Cl.
*H04B 7/00* (2006.01)
*H04M 1/725* (2006.01)
*H04W 4/20* (2009.01)
*H04W 84/18* (2009.01)

(52) U.S. Cl.
CPC ........ *H04M 1/7253* (2013.01); *H04M 2250/64* (2013.01); *H04W 84/18* (2013.01); *H04W 4/206* (2013.01)
USPC .......... 455/41.2; 455/510; 455/515; 370/328; 370/338

(58) Field of Classification Search
USPC ................. 455/41.1, 41.2, 510, 515, 556.1; 370/328, 338
See application file for complete search history.

(56) References Cited

U.S. PATENT DOCUMENTS

| | | | |
|---|---|---|---|
| 7,317,712 B2 | 1/2008 | Ishimura | |
| 7,562,277 B2* | 7/2009 | Park et al. | ..................... 714/748 |
| 2010/0070767 A1 | 3/2010 | Walker et al. | |
| 2010/0211785 A1 | 8/2010 | Park et al. | |
| 2010/0325425 A1 | 12/2010 | Park et al. | |
| 2011/0076948 A1* | 3/2011 | Jabara et al. | ................. 455/41.2 |

FOREIGN PATENT DOCUMENTS

WO   WO 2011-056044   5/2011

OTHER PUBLICATIONS

Klaus Doppler et al., "Advances in D2D Communications: Energy Efficient Service and Device Discovery Radio", 2011 2nd International Conference on Wireless Communication, Vehicular Technology, Information Theory and Aerospace & Electronic Systems Technology (Wireless VITAE), Mar. 3, 2011.

* cited by examiner

*Primary Examiner* — Tuan H Nguyen
(74) *Attorney, Agent, or Firm* — The Farrell Law Firm, P.C.

(57) ABSTRACT

Provided is a method and terminal for wireless local area communication enabling nearby terminals to be paired by generating an identifier containing identification information of an application and randomly selected channel information; broadcasting the identifier to external terminals; performing a pairing procedure with an external terminal having responded to the broadcast identifier; and communicating data related to the application with the paired external terminal.

21 Claims, 12 Drawing Sheets

WIRELESS LOCAL AREA COMMUNICATION METHOD AND TERMINAL SUPPORTING THE SAME

PRIORITY

This application claims priority under 35 U.S.C. §119(a) to Korean Patent Application No. 10-2011-0057211, which was filed in the Korean Intellectual Property Office on Jun. 14, 2011, the entire disclosure of which is incorporated herein by reference.

BACKGROUND OF THE INVENTION

1. Field of the Invention

The present invention relates generally to wireless local area communication and, more particularly, to a method for wireless local area communication that enables nearby terminals to be paired in an easy and rapid way for data communication and a terminal supporting the method.

2. Description of the Related Art

Unlike existing phones with fixed functionality, smart phones allow users to download various applications from online markets and install the downloaded applications therein.

In recent years, high-end mobile terminals with a large storage capacity act as media connections and content sharing between persons and devices. In wireless local area communication, devices may be paired together via Access Points (AP) or may be directly paired without access points. Direct pairing between Wi-Fi devices may be achieved using ad hoc networking, mobile access points or Wi-Fi Direct.

Currently, wireless local area communication may require manual Wi-Fi settings. Pairing procedures may be difficult or complex for users who are unaware of or unfamiliar with wireless local area network technology.

SUMMARY OF THE INVENTION

Accordingly, the present invention has been made to solve the above problems occurring in the prior art and the present invention provides a method and terminal enabling automatic pairing of nearby devices for data communication.

In accordance with an aspect of the present invention, there is provided a method of wireless local area communication for a terminal, including generating an identifier containing identification information of an application and randomly selected channel information; broadcasting the identifier to external terminals; performing a pairing procedure with an external terminal having responded to the broadcast identifier; and communicating data related to the application with the paired external terminal.

In accordance with another aspect of the present invention, there is provided a terminal including a control unit generating an identifier containing identification information of an application and randomly selected channel information; and a wireless communication unit broadcasting, under control of the control unit, the identifier, performing a pairing procedure with an external terminal having responded to the broadcast identifier, and communicating data related to the application with the paired external terminal.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

Figure 1:
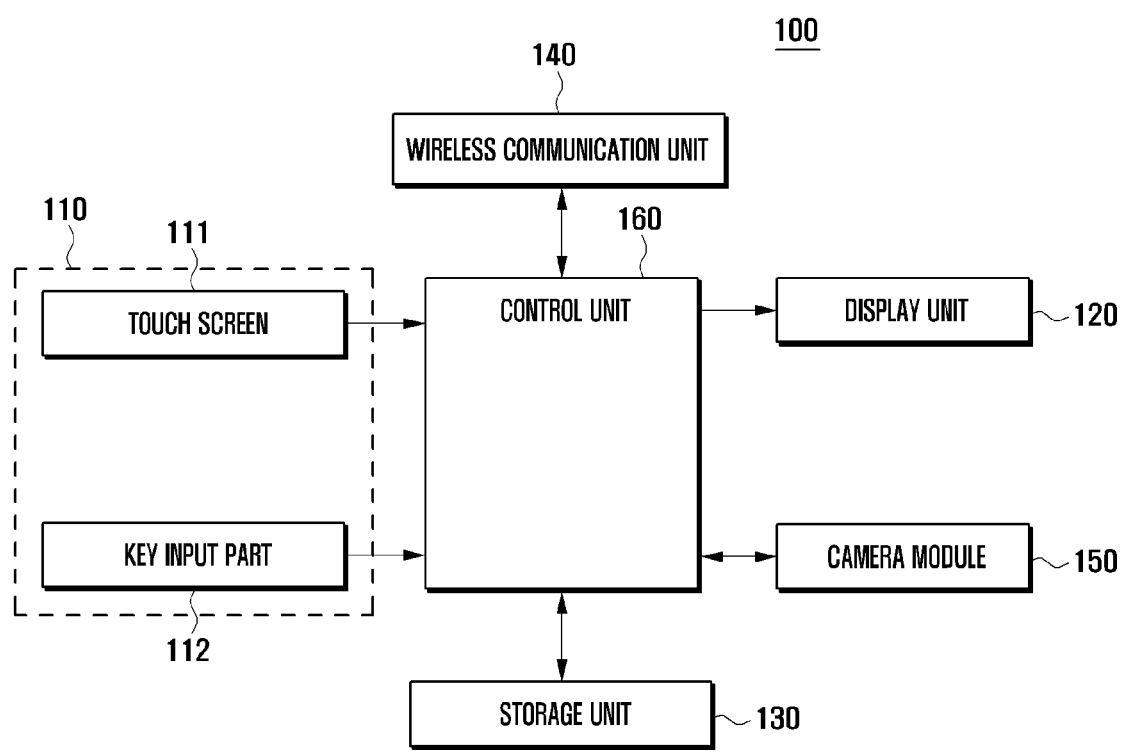
FIG. 1 is a block diagram of a terminal according to an embodiment of the present invention.

Hereinafter, the method and terminal of the present invention are described in various embodiments with reference to the accompanying drawings. Detailed descriptions of well-known functions and structures incorporated herein may be omitted to avoid obscuring the subject matter of the present invention. Particular terms may be defined to describe the invention in the best manner. Accordingly, the meaning of specific terms or words used in the specification and the claims should not be limited to the literal or commonly employed sense, but should be construed in accordance with the spirit of the invention. The description of the various embodiments is does not describe every possible variation of the invention. Therefore, various changes may be made and equivalents may be substituted for elements of the invention.

The terminal of the present invention is a Wi-Fi enabled device, and may be any information, communication or multimedia device, such as a personal computer, laptop computer, desktop computer, MP3 player, Portable Multimedia Player (PMP), Personal Digital Assistant (PDA), tablet personal computer, mobile phone, or smart phone. In the following description, the terminal is assumed to be a smart phone.

In the description, a terminal may be a master terminal or a slave terminal according to the role of an access point or a host. That is, a terminal that generates an identifier for pairing (i.e. Service Set Identifier (SSID)) and accepting a pairing request becomes a master terminal. A terminal that sends a pairing request to the master terminal becomes a slave terminal. In the present invention, a terminal may function as a master terminal or a slave terminal. A terminal may download a pairing application from an online market and install the same therein. A terminal may use an application delivered by a cloud server providing cloud-computing services. In the description, an application refers to an application providing a pairing function, such as an application related to file transfer, gaming, chatting, screen sharing, video calls, voice calls, and remote control. In the following description, applications are assumed to be file transfer applications.

In one embodiment, upon detection of a master start event, the master terminal prepares a pairing procedure by randomly selecting one of multiple channel numbers, generating an identifier on the basis of the selected channel number and identification information related to applications, and broadcasting the generated identifier to external devices or slave terminals. Here, the identification information contains an application specific code. Applications have different codes depending to their types. For example, a gaming application has an application specific code different from that of a file transfer application. The master terminal displays the set channel number to notify the user of the master terminal and users of nearby slave terminals of the channel number. For security reasons, the master terminal may not broadcast the identifier, and may respond to a slave terminal having sent an identifier identical to the identifier of the master terminal. A master terminal may be paired with multiple slave terminals. In some cases, multiple master terminals may be closely located, and, when they use the same identifier, paring errors may occur. Here, the channel number is used to prevent duplication of identifiers. For example, when a channel number is selected from a range of 0 to 999, the probability that two or more master terminals select the same channel number is very low. Hence, as different master terminals use different channel numbers, paring errors due to identifier duplication may be prevented.

In another embodiment, upon detection of a slave start event, the slave terminal may select one of the received identifiers containing application-related identification information, and perform pairing with a master terminal having broadcast the selected identifier. That is, the slave terminal regards a master terminal having broadcast an identifier containing identification information as the master terminal to be paired therewith. Although rare, when two or more identifiers containing identification information are found, the slave terminal may display the two or more identifiers to enable the user to select a desired master terminal. In this case, the slave terminal may select one of the two or more identifiers exhibiting the highest signal strength and perform pairing with a master terminal having broadcast the selected identifier.

FIG. 1 is a block diagram of a terminal 100 according to an embodiment of the present invention.

Referring to FIG. 1, the terminal 100 may include an input unit 110, a display unit 120, a storage unit 130, a wireless communication unit 140, a camera module 150, and a control unit 160. The input unit 110 generates a user input event and sends the user input event to the control unit 160, and may include a touch screen 111 and a key input part 112.

The touch screen 111 generates a touch event and sends the touch event to the control unit 160. A touch event may correspond to a touch and drop action, a drag and drop action or a flick and drop action. Here, the touch and drop action corresponds to pressing with the finger and releasing of the finger at the same point; the drag and drop action corresponds to pressing with the finger, moving the finger in a direction and releasing of the finger; and the flick and drop action corresponds to pressing with the finger, moving the finger quickly in a specific direction and releasing the finger. The control unit 160 may distinguish a flick gesture and a drag gesture by movement speed. The touch and drop action may be classified into a tap gesture and a press gesture depending to the contact maintenance time. That is, the tap gesture is a touch with a short contact maintenance time and the press gesture is a touch with a long contact maintenance time.

Touch events may be classified into a master start event, a master end event, a slave start event and a slave end event depending on usage context. Touch events may be further classified in various ways depending on their location, direction, distance, and pressure. The touch screen 111 may be implemented using resistive type, capacitive type or pressure type technology.

The key input part 112 includes a plurality of keys for manipulating the terminal 100, and sends a key event to the control unit 160. Key events may be a power on or off event, a volume control event, and a screen on or off event.

The display unit 120 converts image data from the control unit 160 into an analog signal and displays the analog signal. Under control of the control unit 160, the display unit 120 divides the screen into an indicator region, a main region and a sub region. The display unit 120 displays indicators for the current time, remaining battery power and signal strength in the indicator region, displays a main screen in the main region, and displays a sub screen in the sub region. Here, the main screen may be one of a lock screen, a home screen and an application control screen. The lock screen is displayed when the display unit 120 is turned on. The home screen includes a plurality of icons associated with various applications. The sub screen may include icons associated with applications currently executed or frequently used. The sub screen may include menu items for changing main screen settings.

The storage unit 130 stores programs and related data necessary for operation of the terminal 100. The storage unit 130 may store an operating system, applications, image data, audio data and video data. The storage unit 130 may be composed of a primary storage part and a secondary storage part. The primary storage part may be implemented using a RAM, and the secondary storage part may be implemented using a flash memory.

The primary storage part is used to load the operating system and an application. When the terminal 100 is turned on, the operating system is loaded from the secondary storage part onto the primary storage part for booting. When an application is invoked, it is loaded from the secondary storage part onto the primary storage part for execution; and when execution of the application is ended, the application is removed from primary storage part. The secondary storage part is used to store the operating system, and various applications and data. The secondary storage part may be segmented into a data area and a program area. In particular, the data area stores application specific codes and a password table for generating identifiers. Here, application specific codes may be represented in Unicode. The password table contains multiple passwords, which correspond to individual channel numbers. As described above, an identifier is composed of a channel number ranging, for example, from 0 to 999 and an application specific code.

The wireless communication unit 140 sends and receives signals for communication related to SMS text messages, MMS multimedia messages, voice calls, video calls and data calls. The wireless communication unit 140 converts voice and sound data and control data into a radio frequency signal and transmits the radio signal, and receives a radio frequency signal and converts the received signal into voice and sound data and control data, using a radio frequency transmitter for up-converting the frequency of a signal to be transmitted and amplifying the signal, and a radio frequency receiver for low-noise amplifying a received signal and down-converting the frequency of the received signal. In addition, the wireless communication unit 140 may include a Wi-Fi module and a Bluetooth® module for accessing an access point or for wireless communication with a nearby device.

The camera module 150 captures an image of a target object and sends the captured image to the control unit 160. The camera module 150 may include a front camera module installed at the front of the terminal and a rear camera module installed at the back.

The control unit 160 controls the overall operation of the terminal 100 and controls the signal exchange between internal components. Upon detection of a lock release event such as a drag and drop from the left to the right, the control unit 160 performs screen transition from the lock screen to the home screen or an application control screen. Upon detection of a touch event such as a tap on an icon, the control unit 160 activates an application associated with the icon and performs a screen transition from the home screen to an application control screen. The control unit 160 performs functions of a master and a slave. These functions are described in detail later with reference to FIGS. 2 to 12. The terminal 100 of FIG. 1 may act as a master or as a slave.

Figure 2:
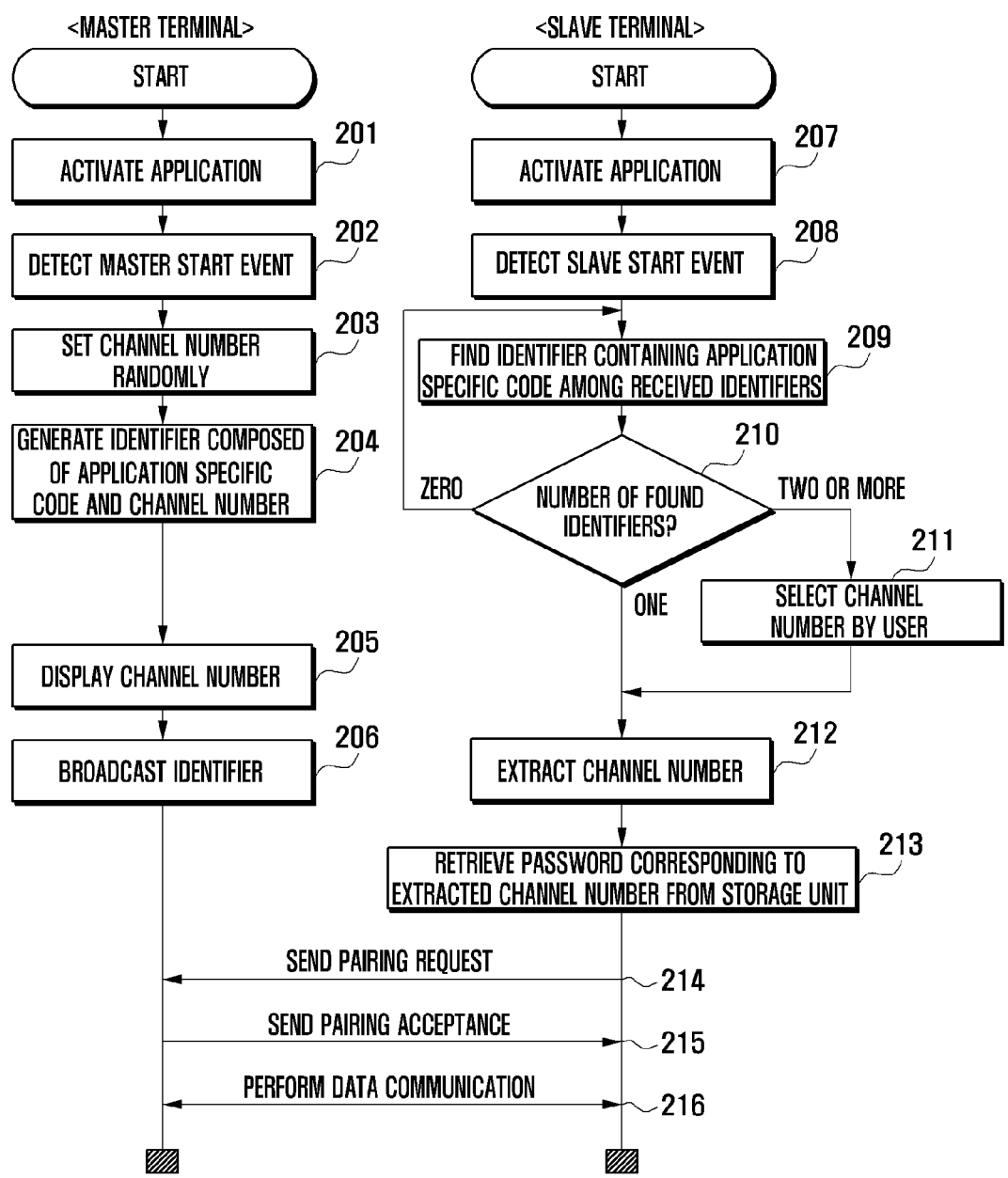
FIG. 2 is a flowchart of a method for wireless local area communication according to an embodiment of the present invention.
Figure 3:
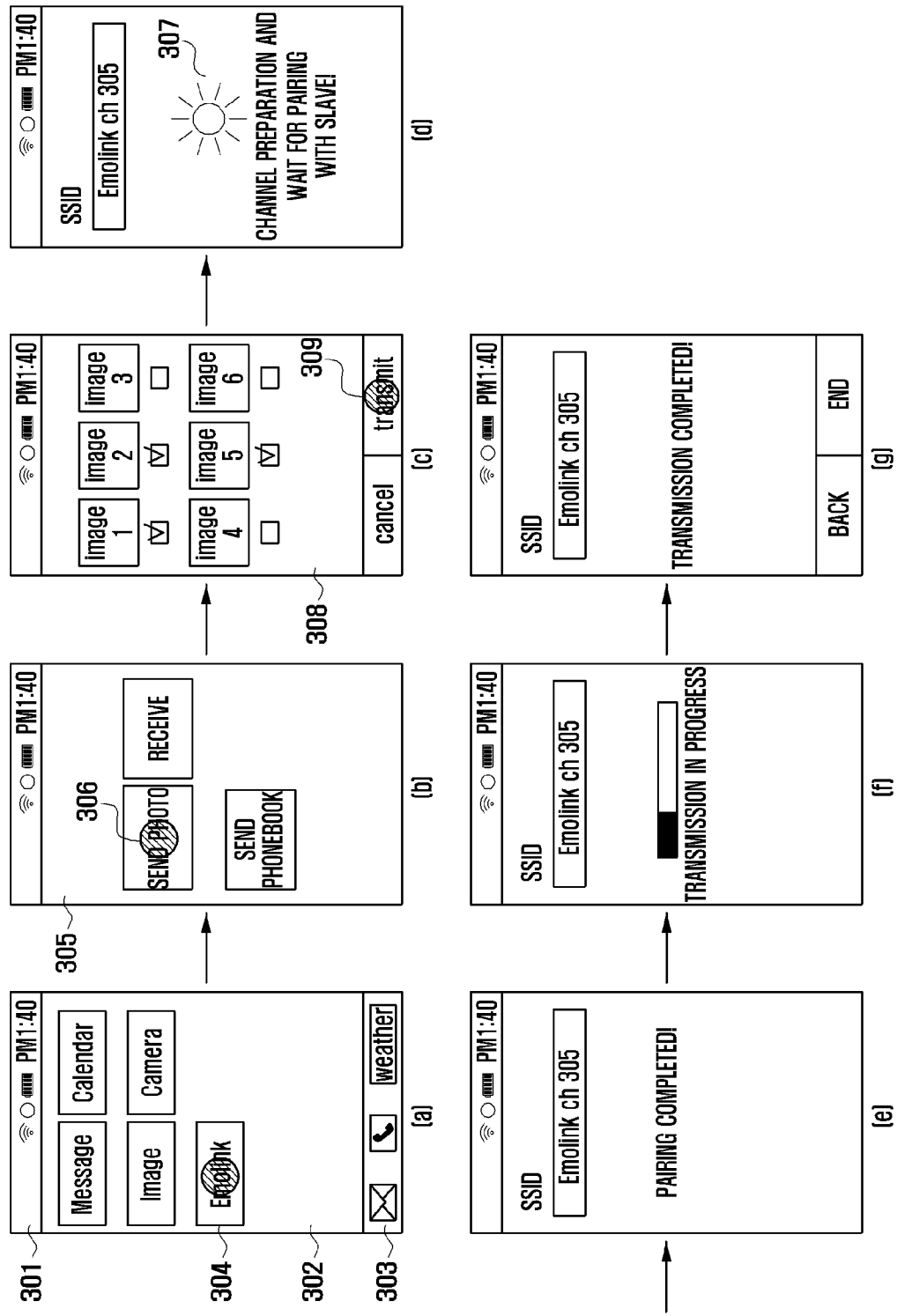
FIG. 3 is a diagram illustrating screens for operations of a master terminal according to an embodiment of the present invention.
Figure 4:
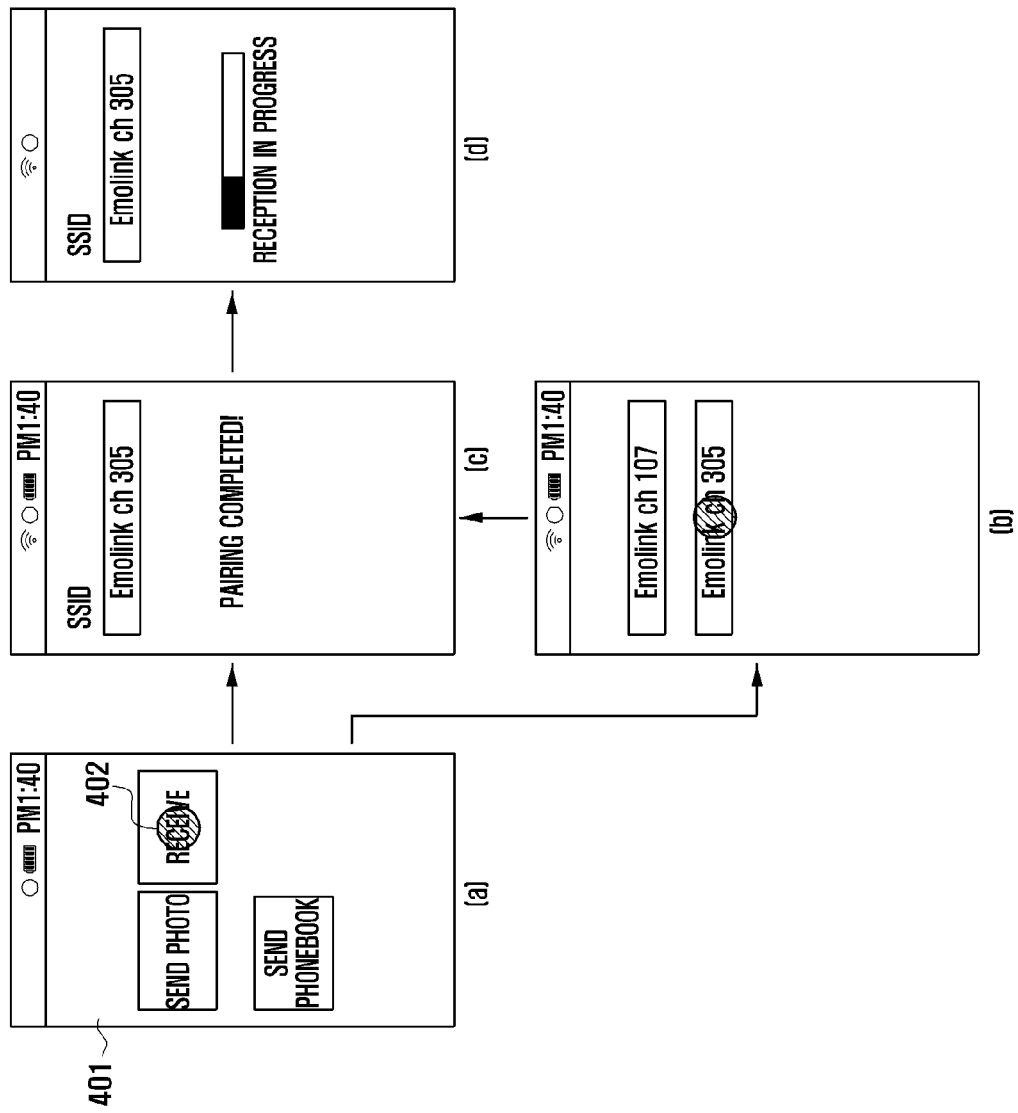
FIG. 4 is a diagram illustrating screens for operations of a slave terminal.

FIG. 2 is a flowchart of a method for wireless local area communication according to another embodiment of the present invention, FIG. 3 is a diagram illustrating screens for operations of the master terminal, and FIG. 4 is a diagram illustrating screens for operations of the slave terminal. Here, the master terminal and the slave terminal are assumed to have the same configuration.

Referring to FIG. 2, in the master terminal, the display unit displays an indicator screen 301, a home screen 302 and a sub screen 303 as indicated by (a) of FIG. 3 under control of the control unit. When the user enters a tap on an icon 304, the control unit activates an application associated with the icon 304 in step 201 and controls the display unit to display an application screen 305 in the main region. Later, the control unit detects a master start event such as a tap on an icon 306 labeled "photo transfer" as indicated by (b) of FIG. 3 in step 202. The control unit controls the display unit to display a photograph selection screen 308 as indicated by (c) of FIG. 3. When the user selects photographs and enters a tap on a "transmit" button 309, the control unit randomly sets a channel number in step 203. For example, the control unit may randomly select a number (for example, 305) from a preset range from 0 to 999 and sets the selected number as a channel number. The control unit generates an identifier composed of the application specific code activated at step 201 and the set channel number "ch 305" in step 204. The control unit controls the display unit to display the application name "Emolink" and the channel number "ch 305" as indicated by (d) of FIG. 3 in step 205, and controls the wireless communication unit to broadcast the identifier in step 206. The control unit may control the display unit to display an icon 307 to indicate channel preparation and a wait for pairing with a slave terminal as indicated by (d) of FIG. 3.

In the slave terminal, the control unit activates a requested application in step 207 and controls the display unit to display an application screen 401 in the main region as indicated by (a) of FIG. 4. Later, the control unit detects a slave start event such as a tap on a "receive" icon 402 as indicated by (a) of FIG. 4 in step 208. The control unit finds identifiers containing an application specific code among identifiers received through the wireless communication unit in step 209, and counts the number of found identifiers in step 210. When no identifier is found, the control unit returns to step 209. When one identifier is found, the control unit selects the identifier and proceeds to step 212. When two or more identifiers are found, the control unit displays the found identifiers (for example, "EmoLink ch 107" and "EmoLink ch 305") as indicated by (b) of FIG. 4. When the user enters a tap on one of the displayed identifiers containing a channel number identical to the channel number (i.e., "ch 305") set by the master terminal, the control unit selects the identifier containing the channel number "ch 305" set by the master terminal in step 211.

The control unit of the slave terminal extracts the channel number (i.e., "ch 305") from the selected identifier in step 212. The control unit retrieves a password corresponding to the extracted channel number (i.e., "ch 305") from the storage unit in step 213. The control unit controls the wireless communication unit to transmit a pairing request signal to the master terminal in step 214. Here, the pairing request signal contains the retrieved password and the identifier sent by the master terminal.

The wireless communication unit of the master terminal receives the pairing request signal from the slave terminal. The control unit retrieves a password corresponding to the broadcast identifier from the storage unit. When the retrieved password is identical to the received password, the control unit controls the wireless communication unit to transmit a pairing acceptance signal to the slave terminal in step 215. After completion of pairing with the slave terminal, the control unit of the master terminal may control the display unit to display a notification, such as "Pairing completed!" as indicated by (e) of FIG. 3. After completion of pairing, the control unit of the slave terminal may also control the display unit to display a notification "Pairing completed!" as indicated by (c) of FIG. 4.

After pairing, the master terminal performs data communication with the slave terminal in step 216. For example, the control unit of the master terminal may control the wireless communication unit to send the photographs selected at step 202 to the slave terminal, and also control the display unit to display the transmission status as indicated by (f) of FIG. 3. After sending the photographs, the control unit may control the display unit to display an indication, such as "transmission completed" as indicated by (g) of FIG. 3. The wireless communication unit of the slave terminal receives the photographs from the master terminal, and the control unit may control the display unit to display the reception status as indicated by (d) of FIG. 4.

As described above, the method of the present invention may simplify the procedure of pairing. For example, the user of the master terminal may complete the pairing procedure by entering a tap on the icon 304 mapped with an application and entering a tap on the icon 306 labeled "photo transfer". The user of the slave terminal may also complete the pairing procedure by entering two or three taps.

Figure 5:
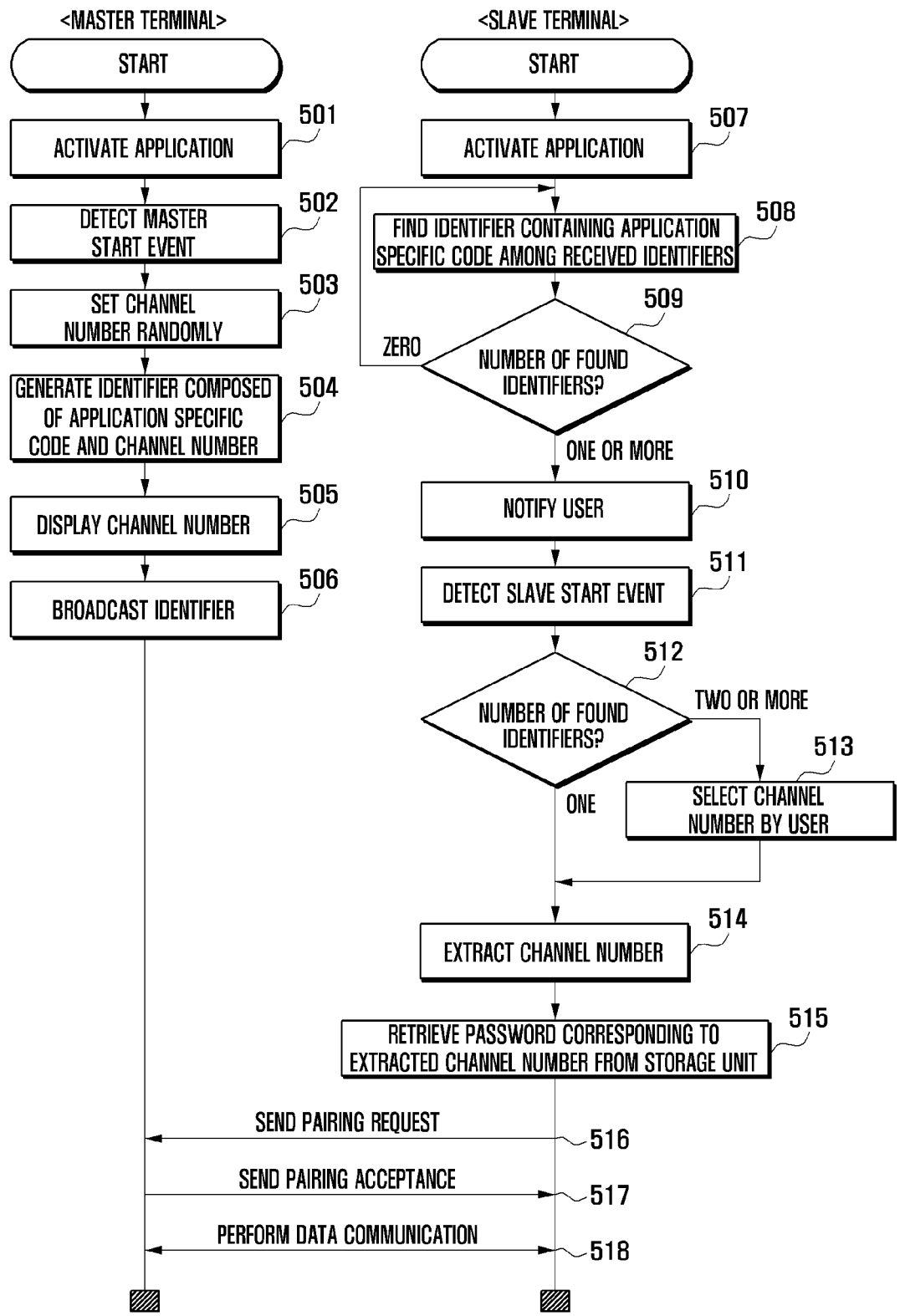
FIG. 5 is a flowchart of a method for wireless local area communication according to an embodiment of the present invention.

FIG. 5 is a flowchart of a method for wireless local area communication according to another embodiment of the present invention.

Referring to FIG. 5, in the master terminal, upon detection of an execution event such as a tap on an icon mapped with an application, the control unit activates the application in step 501. Later, the control unit detects a master start event in step 502 and randomly sets a channel number in step 503. The control unit generates an identifier composed of the application specific code and the set channel number in step 504. The control unit controls the display unit to display the channel number in step 505, and controls the wireless communication unit to broadcast the identifier in step 506.

In this embodiment, when an application is activated, the slave terminal may continuously search for a master terminal broadcasting an identifier containing a desired application specific code and notify the user of the found master terminal. More specifically, in the slave terminal, upon detection of an execution event mapped with an application, the control unit activates the application in step 507. The control unit finds identifiers containing the application specific code among identifiers received through the wireless communication unit in step 508, and counts the number of found identifiers in step 509. When no identifier is found, the control unit returns to step 508. When at least one identifier is found, the control unit notifies the user of the search result in step 510. For example, the control unit may control the display unit to display a notification. Thereafter, the control unit detects a slave start event in step 511, and examines the number of found identifiers in step 512. When one identifier is found, the control unit selects the identifier and proceeds to step 514. When two or more identifiers are found, the control unit controls the display unit to display the channel numbers of the found identifiers. The user enters a tap on one of the channel numbers identical to that of the master terminal, and the control unit selects one of the found identifiers containing the tapped channel number in step 513. The control unit extracts the channel number from the selected identifier in step 514. The control unit retrieves a password corresponding to the extracted channel number from the storage unit in step 515. The control unit controls the wireless communication unit to transmit a pairing request signal to the master terminal in step 516. In the master terminal, the wireless communication unit receives the pairing request signal from the slave terminal. The control unit of the master terminal retrieves a password corresponding to the broadcast identifier from the storage unit. When the retrieved password is identical to the received password, the control unit controls the wireless communication unit to transmit a pairing acceptance signal to the slave terminal in step 517. After pairing, the master terminal performs data communication with the slave terminal in step 518.

Figure 6:
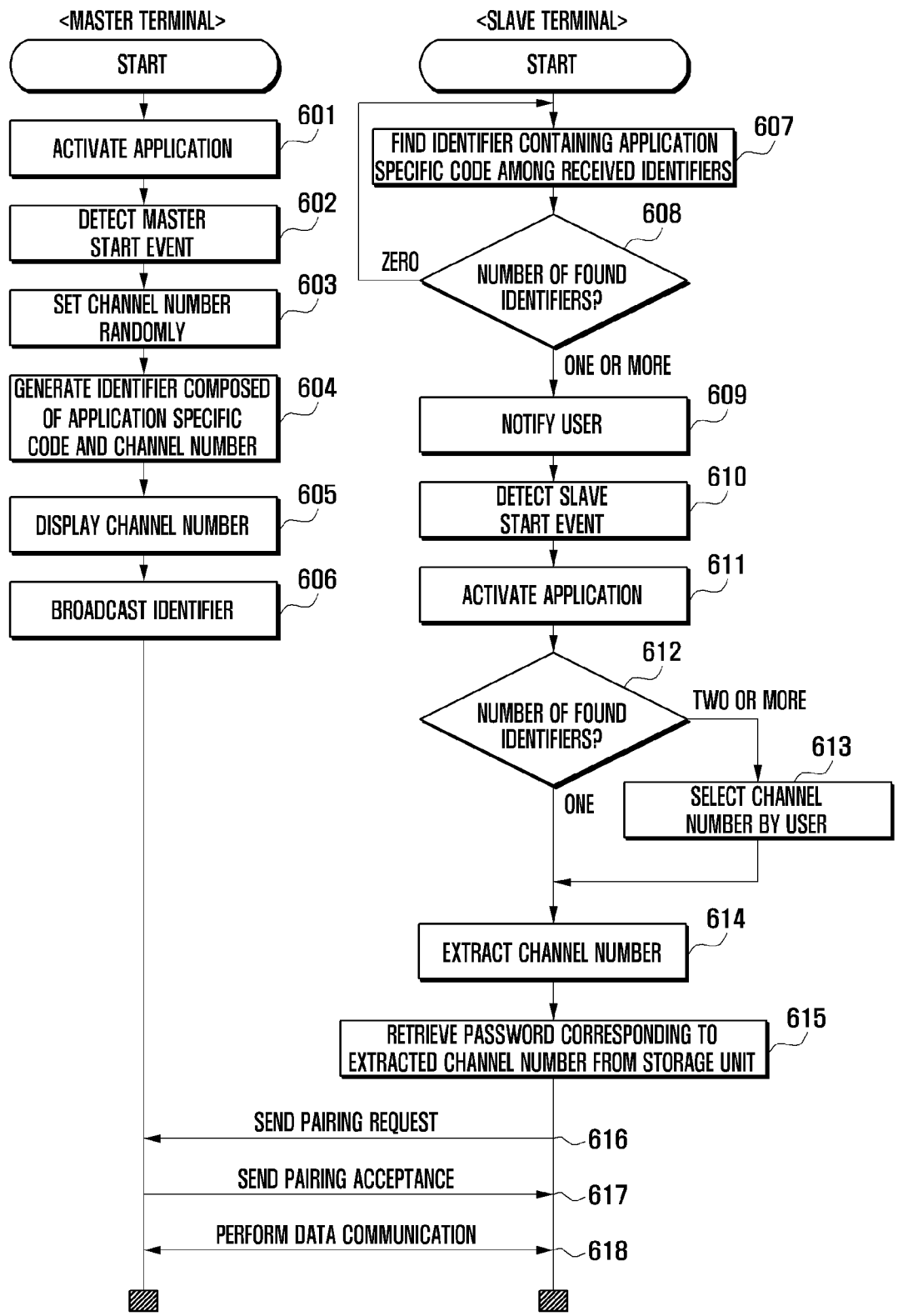
FIG. 6 is a flowchart of a method for wireless local area communication according to an embodiment of the present invention.

FIG. 6 is a flowchart of a method for wireless local area communication according to another embodiment of the present invention.

Referring to FIG. 6, in the master terminal, upon detection of an execution event associated with an application, the control unit activates the application in step 601. Later, the control unit detects a master start event in step 602 and randomly sets a channel number in step 603. The control unit generates an identifier composed of the application specific code and the set channel number in step 604. The control unit controls the display unit to display the channel number in step 605, and controls the wireless communication unit to broadcast the identifier in step 606.

In this embodiment, although an application is not activated, the slave terminal may continuously search for a master terminal broadcasting an identifier containing an application specific code and notify the user of the found master terminal. More specifically, in the slave terminal, the control unit finds identifiers containing an application specific code among identifiers received through the wireless communication unit in step 607, and counts the number of found identifiers in step 608. When no identifier is found, the control unit returns to step 607. When at least one identifier is found, the control unit notifies the user of the search result in step 609. For example, the control unit may control the display unit to display a notification for the found identifier and an enquiry message for the slave function. Thereafter, the control unit detects a slave start event in step 610, and automatically activates an application associated with the slave start event in step 611. The control unit examines the number of found identifiers in step 612. When one identifier is found, the control unit selects the identifier and proceeds to step 614. When two or more identifiers are found, the control unit controls the display unit to display the channel numbers of the found identifiers. The user enters a tap on one of the channel numbers identical to that of the master terminal, and the control unit selects one of the found identifiers containing the tapped channel number in step 613. The control unit extracts the channel number from the selected identifier in step 614. The control unit retrieves a password corresponding to the extracted channel number from the storage unit in step 615. The control unit controls the wireless communication unit to transmit a pairing request signal to the master terminal in step 616. In the master terminal, the wireless communication unit receives the pairing request signal from the slave terminal. The control unit of the master terminal retrieves a password corresponding to the broadcast identifier from the storage unit. When the retrieved password is identical to the received password, the control unit controls the wireless communication unit to transmit a pairing acceptance signal to the slave terminal in step 617. After pairing, the master terminal performs data communication with the slave terminal in step 618.

Figure 7:
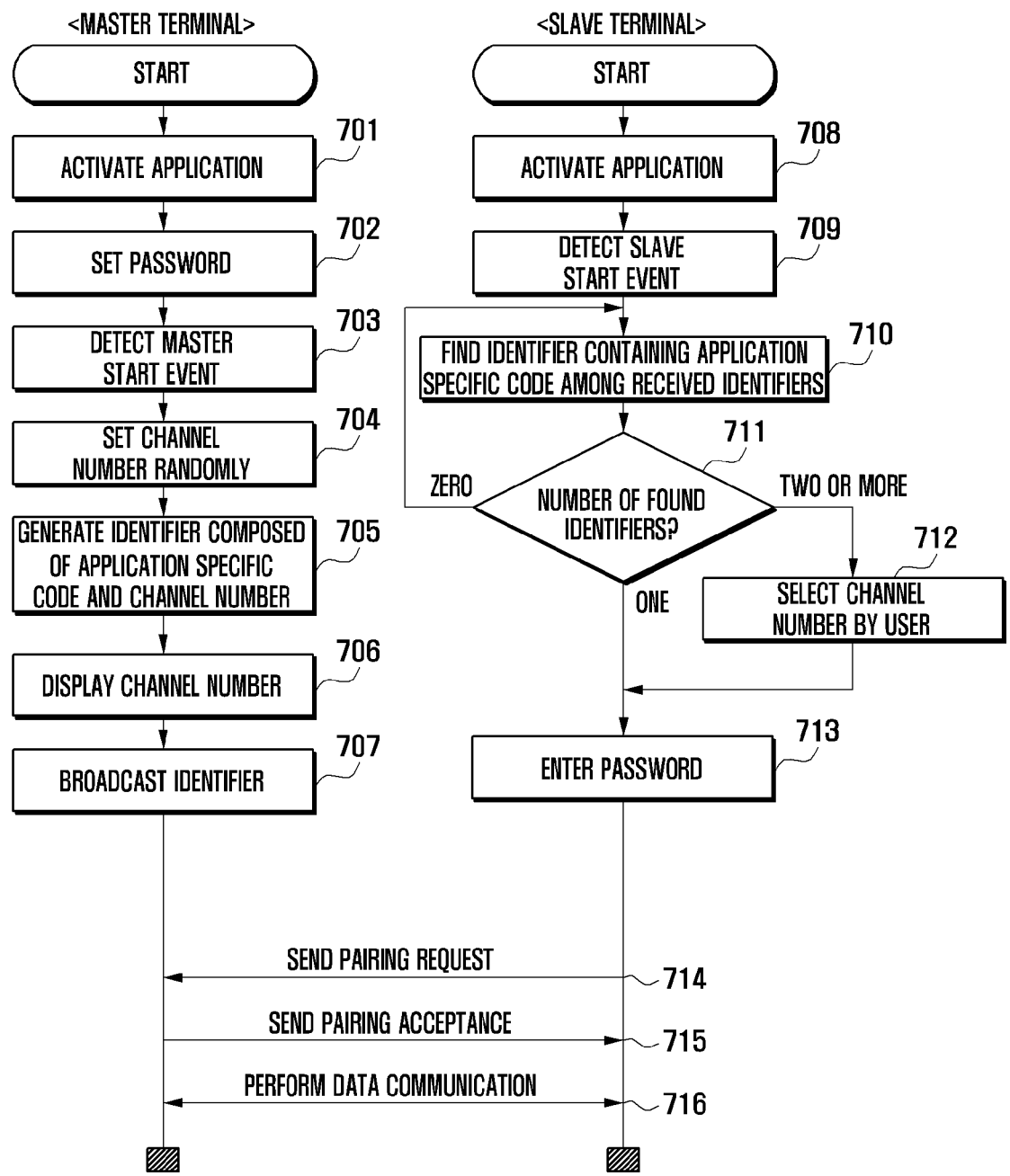
FIG. 7 is a flowchart of a method for wireless local area communication according to an embodiment of the present invention.

FIG. 7 is a flowchart of a method for wireless local area communication according to another embodiment of the present invention.

In the embodiment of FIG. 7, to increase security, the password for pairing is not stored in the password table of the storage unit but is directly set by the user. More specifically, in the master terminal, upon detection of an execution event associated with an application, the control unit activates the application in step 701. Later, the control unit sets a password for pairing in step 702. For example, the control unit controls the display unit to display a request message for setting a password. When the user enters a password through the input unit, the input unit forwards the input password to the control unit and the control unit sets the input password as a password for pairing. Later, the control unit detects a master start event in step 703 and randomly sets a channel number in step 704. The control unit generates an identifier composed of the application specific code and the set channel number in step 705. The control unit controls the display unit to display the channel number in step 706, and controls the wireless communication unit to broadcast the identifier in step 707.

In the slave terminal, upon detection of an execution event associated with an application, the control unit activates the application in step 708. Thereafter, the control unit detects a slave start event in step 709. The control unit finds identifiers containing an application specific code among identifiers received through the wireless communication unit in step 710, and counts the number of found identifiers in step 711. When no identifier is found, the control unit returns to step 710. When one identifier is found, the control unit selects the identifier and proceeds to step 713. When two or more identifiers are found, the control unit controls the display unit to display the channel numbers of the found identifiers. The user enters a tap on one of the channel numbers identical to that of the master terminal, and the control unit selects one of the found identifiers containing the tapped channel number in step 712. The control unit controls the display unit to display a password input field in step 713. When the user of the slave terminal enters a password through the input unit, the input unit forwards the input password to the control unit and the control unit sets the input password as a password for pairing. Thereafter, the control unit controls the wireless communication unit to transmit a pairing request signal to the master terminal in step 714. Here, the pairing request signal contains the identifier of the master terminal and the password entered by the user. In the master terminal, the wireless communication unit receives the pairing request signal from the slave terminal. When the set password is identical to the received password, the control unit controls the wireless communication unit to transmit a pairing acceptance signal to the slave terminal in step 715. After pairing, the master terminal performs data communication with the slave terminal in step 716.

Figure 8:
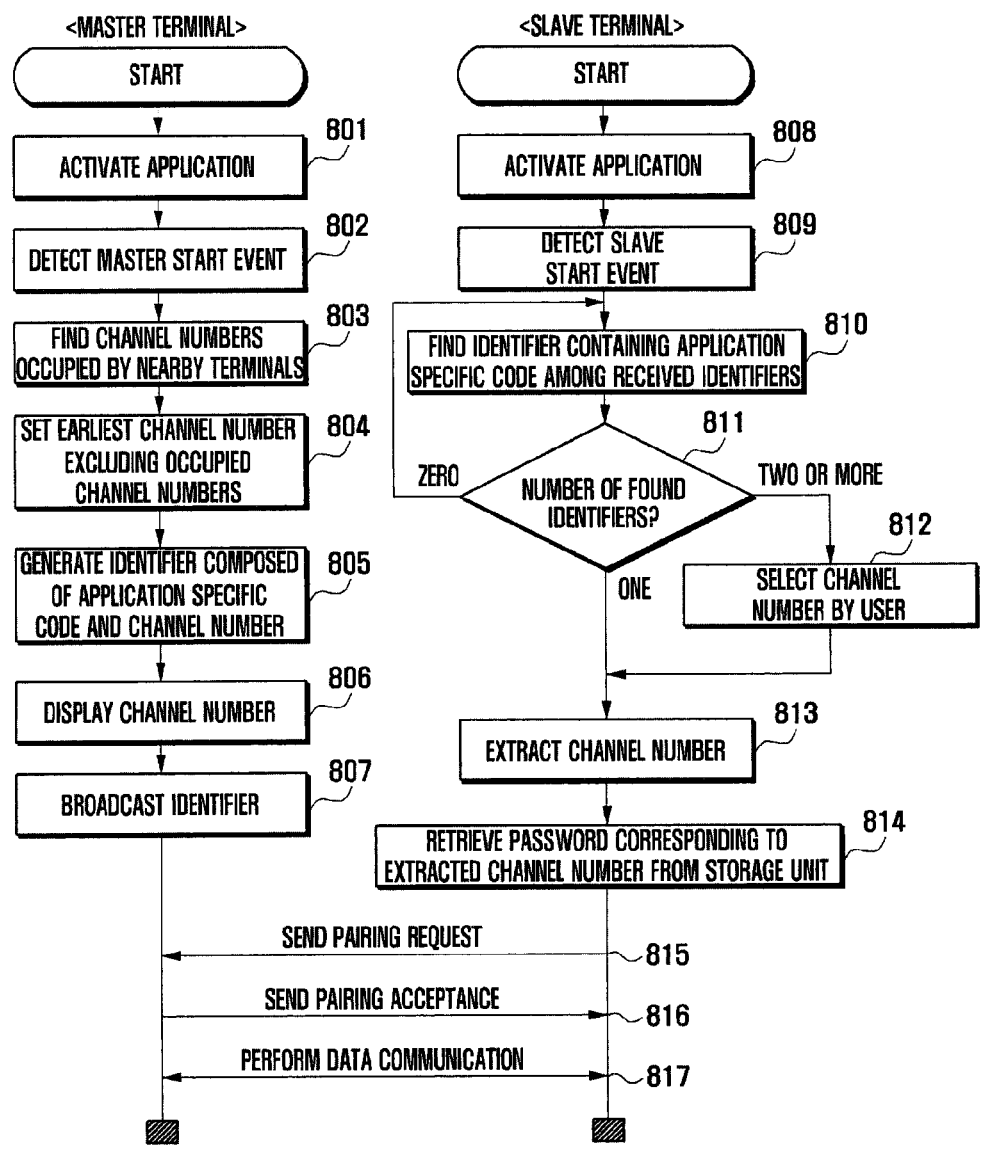
FIG. 8 is a flowchart of a method for wireless local area communication according to an embodiment of the present invention.

FIG. 8 is a flowchart of a method for wireless local area communication according to another embodiment of the present invention.

In the embodiment of FIG. 8, the master terminal may not randomly set a channel number but set a channel number not used by nearby terminals. More specifically, in the master terminal, upon detection of an execution event associated with an application, the control unit activates the application in step 801. Later, the control unit detects a master start event in step 502, and finds channel numbers used by nearby terminals in step 803. Namely, the control unit finds identifiers containing an application specific code among identifiers received through the wireless communication unit, and extracts channel numbers from the found identifiers. The control unit sets the smallest channel number excluding the extracted channel numbers in step 804. For example, when channel numbers "ch 0" and "ch 1" are found or extracted, the control unit may set the smallest channel number ("ch 2") excluding "ch 0" and "ch 1". As such, when master terminals use sequential channel numbers, it is possible to prevent errors due to usage of the same channel number. Further, slave terminals may display channel numbers in sequence. The control unit generates an identifier composed of the application specific code and the set channel number in step 805. The control unit controls the display unit to display the channel number in step 806 and controls the wireless communication unit to broadcast the identifier in step 807.

In the slave terminal, upon detection of an execution event mapped with an application, the control unit activates the application in step 808. Later, the control unit detects a slave start event in step 809. The control unit finds identifiers containing the application specific code among identifiers received through the wireless communication unit in step 810, and counts the number of found identifiers in step 811. When no identifier is found, the control unit returns to step 810. When one identifier is found, the control unit selects the identifier and proceeds to step 813. When two or more identifiers are found, the control unit controls the display unit to display the channel numbers (for example, "ch 0", "ch 1" and "ch 2") of the found identifiers. The user enters a tap on one of the channel numbers identical to that of the master terminal (for example, "ch 2"), and the control unit selects one of the found identifiers containing the tapped channel number in step 812. The control unit extracts the channel number from the selected identifier in step 813. The control unit retrieves a password corresponding to the extracted channel number from the storage unit in step 814. The control unit controls the wireless communication unit to transmit a pairing request signal to the master terminal in step 815. In the master terminal, the wireless communication unit receives the pairing request signal from the slave terminal. The control unit of the master terminal retrieves a password corresponding to the broadcast identifier from the storage unit. When the retrieved password is identical to the received password, the control unit controls the wireless communication unit to transmit a pairing acceptance signal to the slave terminal in step 816. After pairing, the master terminal performs data communication with the slave terminal in step 817.

Figure 9:
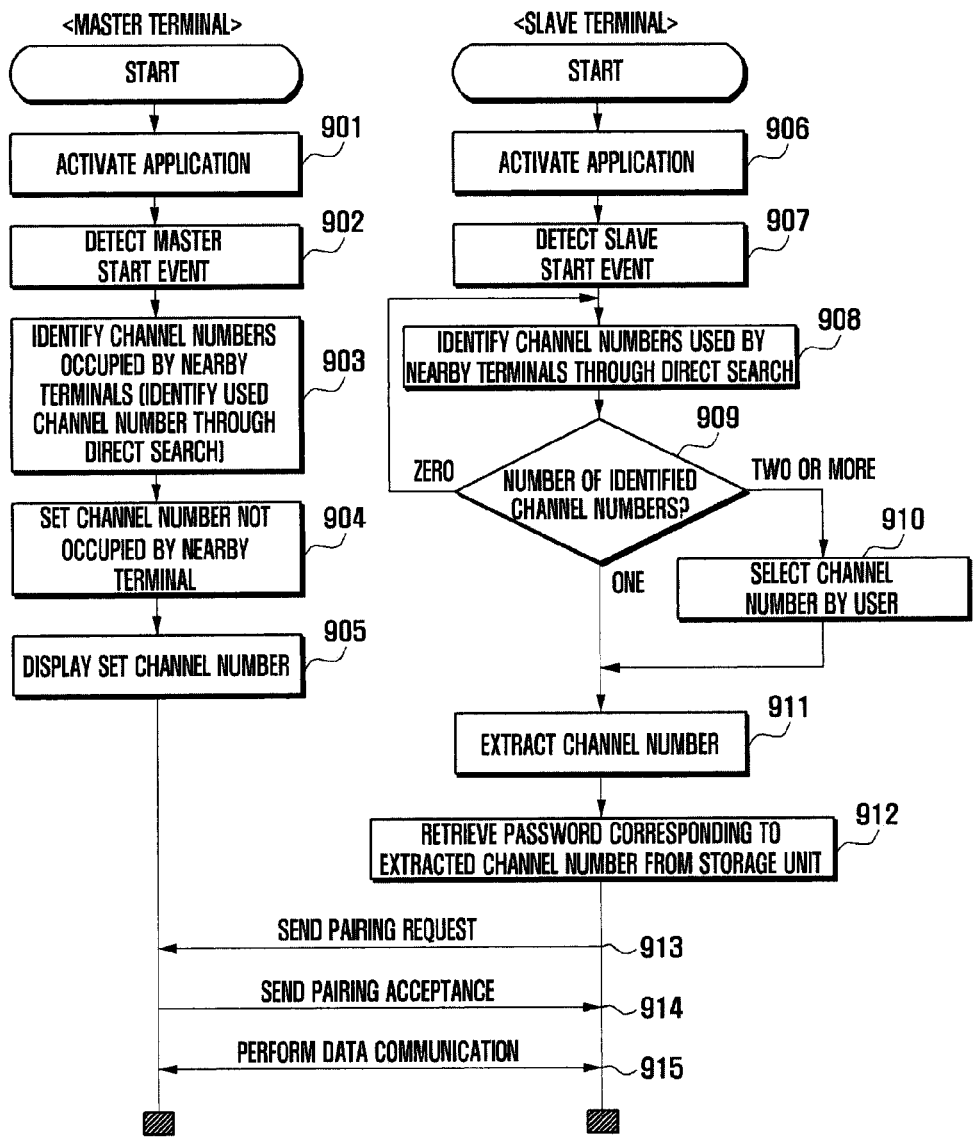
FIG. 9 is a flowchart of a method for wireless local area communication according to an embodiment of the present invention.

FIG. 9 is a flowchart of a method for wireless local area communication according to another embodiment of the present invention.

In the embodiment of FIG. 9, the master terminal may skip identifier broadcasting to increase security. In the master terminal, upon detection of an execution event associated with an application, the control unit activates the application in step 901. Later, the control unit detects a master start event in step 902 and then identifies channel numbers used by nearby terminals in step 903, wherein, the control unit identifies channel numbers used by other terminals through direct search. The control unit sets a channel number not used by nearby terminals in step 904 and controls the display unit to display the set channel number in step 905. More specifically, in steps 903 to 905, the control unit of the master terminal generates a first inquiry identifier and controls the wireless communication unit to broadcast the first inquiry identifier to find another master terminal. When no other master terminal responds to the first inquiry identifier, the control unit sets the first inquiry identifier as an identifier for pairing. When another master terminal responds to the first inquiry identifier, the control unit generates a second inquiry identifier and controls the wireless communication unit to broadcast the second inquiry identifier. This process may be repeated until no master terminal responds. Here, the first inquiry identifier may be generated by combining an application specific code with a selected channel number; the second inquiry identifier may be generated by combining the application specific code with the next channel number (or the previous channel number); and so on with increasing channel number (or decreasing channel number). For example, the control unit broadcasts "EmoLink ch 0" as a first inquiry identifier. When no other master terminal responds to the first inquiry identifier, the control unit sets "EmoLink ch 0" as an identifier for pairing. When another master terminal responds to the first inquiry identifier, the control unit may broadcast "EmoLink ch 1" as a second inquiry identifier. Thereafter, the control unit controls the display unit to display the set identifier or the channel number (for example, "ch 1") contained in the identifier.

In the slave terminal, upon detection of an execution event mapped with an application, the control unit activates the application in step 906. In step 907, the control unit detects a slave start event and then identifies channel numbers used by nearby terminals through direct search in step 908. In step 908, the control unit, in order to find the master terminal, generates a first inquiry identifier and controls the wireless communication unit to broadcast the first inquiry identifier. When a master terminal responds to the first inquiry identifier, the control unit generates a second inquiry identifier and controls the wireless communication unit to broadcast the second inquiry identifier. This process may be repeated using the next inquiry identifier until no master terminal responds. Here, the first inquiry identifier may be generated by combining an application specific code with a selected channel number; the second inquiry identifier may be generated by combining the application specific code with the next channel number (or the previous channel number); and so on with increasing channel number (or decreasing channel number). In particular, the slave terminal sets channel numbers in the same manner as the master terminal. As the master terminal sets channel numbers in ascending order from "ch 0" to find other master terminals, the slave terminal sets channel numbers in ascending order from "ch 0". After identification of used channel numbers, the control unit counts the number of identified channel numbers in step 909. When no channel number is identified, the control unit returns to step 908. When one channel number is identified, the control unit selects the identifier containing the identified channel number and proceeds to step 911. When two or more channel numbers are identified, the control unit controls the display unit to display the identified channel numbers (for example, "ch 0" and "ch 1"). The user taps one of the channel numbers identical to that of the master terminal (for example, "ch 1"), and the control unit selects one of the found identifiers containing the tapped channel number in step 910. The control unit extracts the channel number from the selected identifier in step 911. The control unit retrieves a password corresponding to the extracted channel number from the storage unit in step 912. The control unit controls the wireless communication unit to transmit a pairing request signal to the master terminal in step 913. In the master terminal, the wireless communication unit receives the pairing request signal from the slave terminal. The control unit of the master terminal retrieves a password corresponding to the identifier thereof from the storage unit. When the retrieved password is identical to the received password, the control unit controls the wireless communication unit to transmit a pairing acceptance signal to the slave terminal in step 914. After pairing, the master terminal performs data communication with the slave terminal in step 915.

Figure 10:
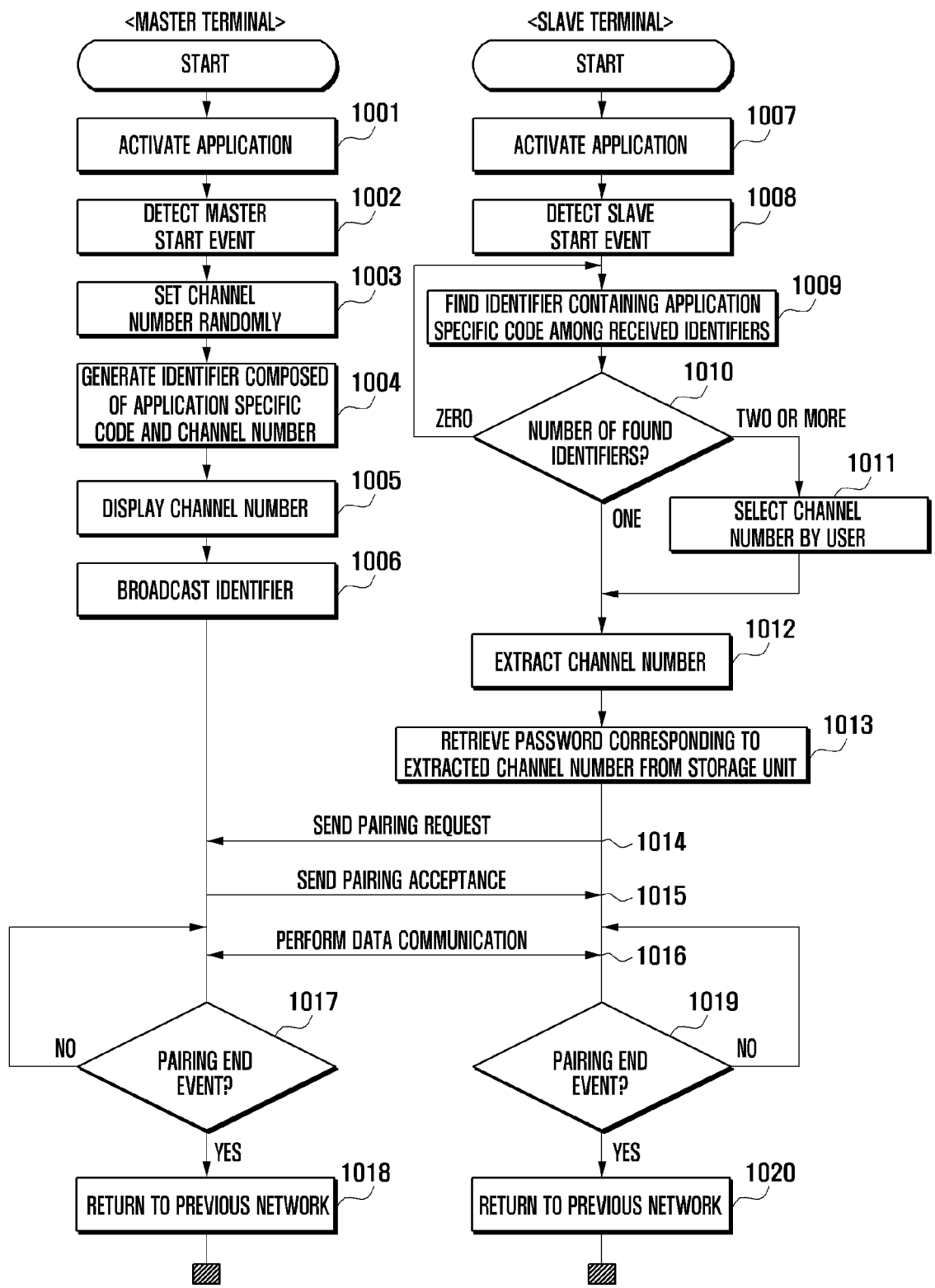
FIG. 10 is a flowchart of a method for wireless local area communication according to an embodiment of the present invention.
Figure 11:
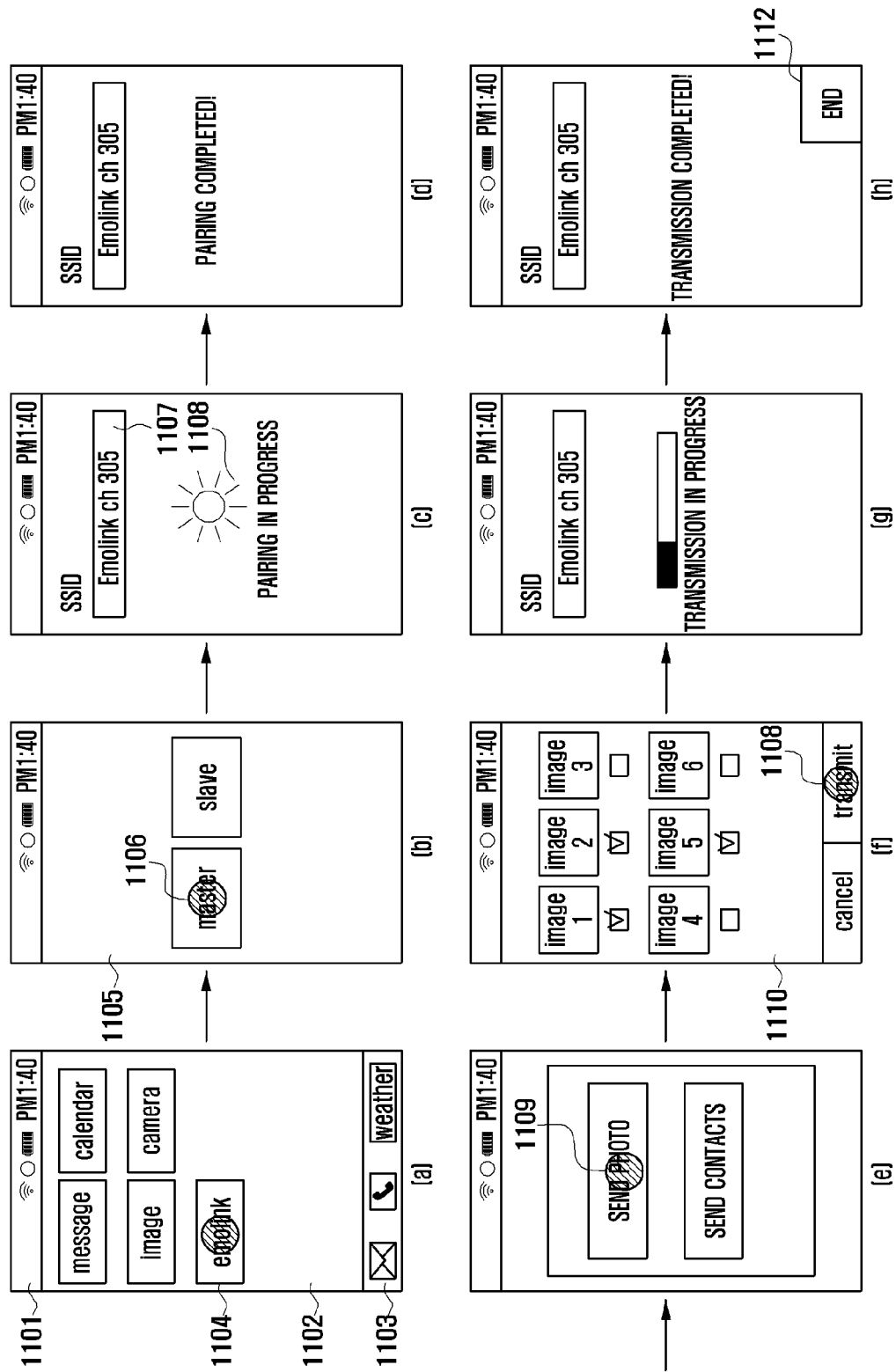
FIG. 11 is a diagram illustrating screens for operations of a master terminal according to an embodiment of the present invention.
Figure 12:
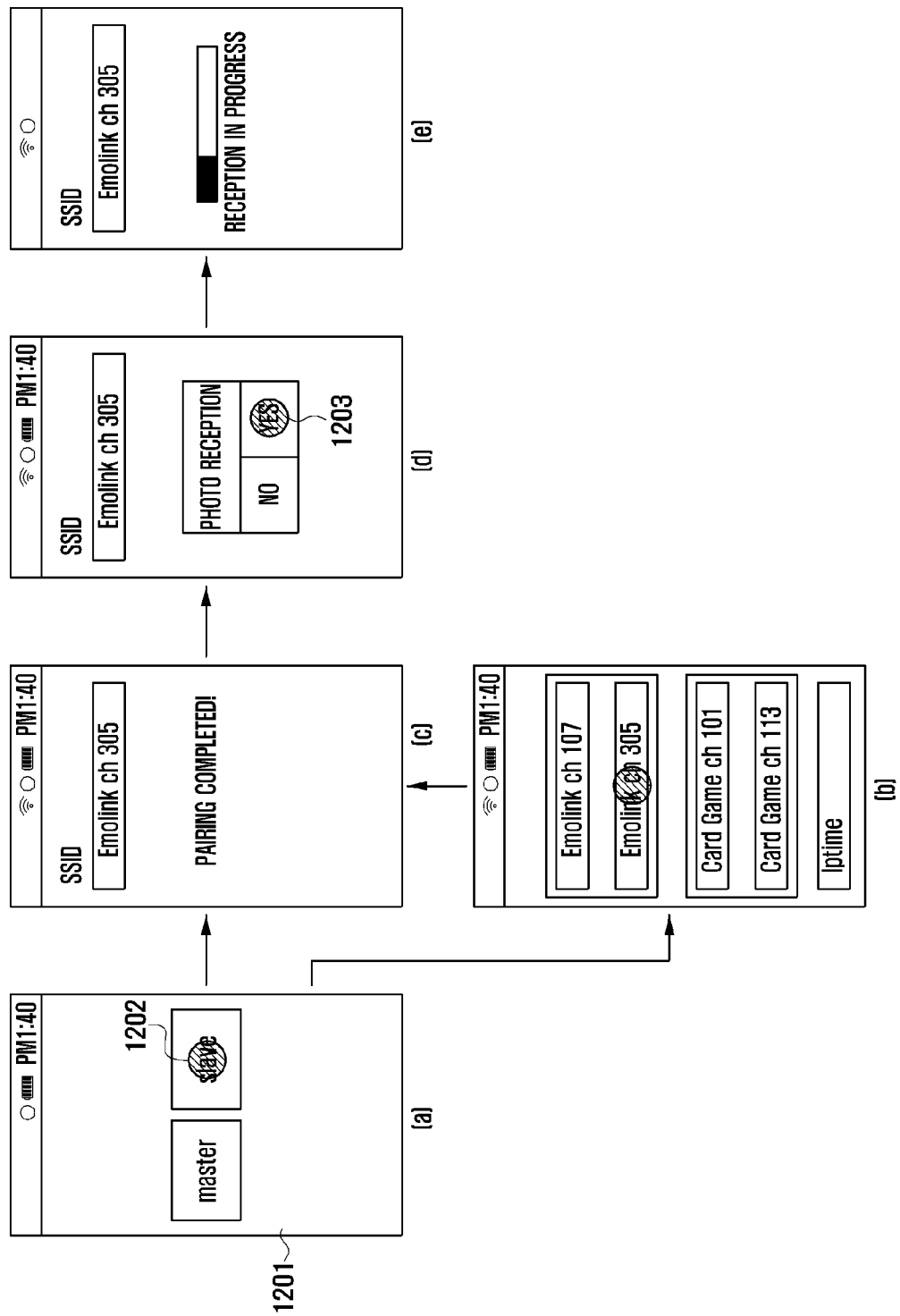
FIG. 12 is a diagram illustrating screens for operations of a slave terminal according to an embodiment of the present invention.

FIG. 10 is a flowchart of a method for wireless local area communication according to another embodiment of the present invention, FIG. 11 is a diagram illustrating screens for operations of the master terminal, and FIG. 12 is a diagram illustrating screens for operations of the slave terminal. As described below, the master terminal and the slave terminal may return to the previous networks after termination of pairing.

Referring to FIG. 10, in the master terminal, the display unit displays an indicator screen 1101, a home screen 1102 and a sub screen 1103 as indicated by (a) of FIG. 11 under control of the control unit. When the user enters a tap on an icon 1104, the control unit activates an application associated with the icon 1104 in step 1001 and controls the display unit to display an application screen 1105 in the main region. Later, the control unit detects a master start event such as a tap on an icon 1106 labeled "master" as indicated by (b) of FIG. 11 in step 1002. The control unit randomly sets a channel number in step 1003. The control unit generates an identifier composed of the application specific code and the set channel number in step 1004. The control unit controls the display unit to display the channel number 1107 as indicated by (c) of FIG. 11 in step 1005, and controls the wireless communication unit to broadcast the identifier in step 1006. The control unit may control the display unit to display an icon 1108 indicating a pairing attempt as indicated by (c) of FIG. 11. The control unit may broadcast a security enforcement indicator together with the identifier.

In the slave terminal, the control unit activates a requested application in step 1007 and controls the display unit to display an application screen 1201 in the main region as indicated by (a) of FIG. 12. Later, the control unit detects a slave start event such as a tap on an icon 1202 labeled "slave" as indicated by (a) of FIG. 12 in step 1008. The control unit finds identifiers containing an application specific code among identifiers received through the wireless communication unit in step 1009, and counts the number of found identifiers in step 1010. When no identifier is found, the control unit returns to step 1009. When one identifier is found, the control unit selects the identifier and proceeds to step 1012. When two or more identifiers are found, the control unit controls the display unit to display the found identifiers (for example, "EmoLink ch 107" and "EmoLink ch 305") as indicated by (b) of FIG. 12. Here, the control unit may also display an application name such as "Card Game" to indicate a master terminal executing an online card game application, and further display an access point name such as "Iptime". When the user enters a tap on one of the displayed identifiers containing a channel number identical to the channel number (i.e., "ch 305") set by the master terminal, the control unit selects the identifier (i.e., "EmoLink ch 305") containing the channel number ("ch 305") set by the master terminal in step 1011.

The control unit of the slave terminal extracts the channel number from the selected identifier in step 1012. The control unit retrieves a password corresponding to the extracted channel number from the storage unit in step 1013. Here, when the master terminal does not require a security setting, step 1013 may be skipped. The control unit controls the wireless communication unit to transmit a pairing request signal to the master terminal in step 1014. In the master terminal, the wireless communication unit receives the pairing request signal from the slave terminal. The control unit retrieves a password corresponding to the broadcast identifier from the storage unit. When the retrieved password is identical to the received password, the control unit controls the wireless communication unit to transmit a pairing acceptance signal to the slave terminal in step 1015. After completion of pairing with the slave terminal, the master terminal may stop broadcasting of the identifier to disable pairing with another terminal. Alternatively, the master terminal may continue to broadcast the identifier in order to communicate with multiple slave terminals. After completion of pairing, the control unit of the master terminal may control the display unit to display a notification such as "Pairing completed!" as indicated by (d) of FIG. 11. After completion of pairing, the control unit of the slave terminal may also control the display unit to display a notification such as "Pairing completed!" as indicated by (c) of FIG. 12.

After pairing, the master terminal performs data communication with the slave terminal in step 1016. For example, when the user enters a tap on a button 1109 labeled "send photo" as indicated by (e) of FIG. 11, the control unit controls the display unit to display a photograph selection screen 1110 as indicated by (f) of FIG. 11. When the user selects photographs to be sent and enters a tap on a "transmit" button 1111, the control unit controls the wireless communication unit to transmit the selected photographs to the slave terminal. The control unit may also control the display unit to display the transmission status as indicated by (g) of FIG. 11. After sending the photographs, the control unit may control the display unit to display an indication "transmission completed" as indicated by (h) of FIG. 11. In the slave terminal, when the user enters a tap on a button 1203 labeled "receive photo" as indicated by (d) of FIG. 12, the control unit controls the wireless communication unit to receive photographs. The control unit may control the display unit to display the reception status as indicated by (e) of FIG. 12. Later, when the control unit of the master terminal detects an application end event such as a tap on an "end" button 1112 as indicated by (h) of FIG. 11 in step 1017, it returns to the previous network in step 1018. For example, the control unit of the master terminal may terminate pairing with the slave terminal and restore a previous connection to a network such as an access point. Likewise, when the control unit of the slave terminal detects an application end event in step 1019, it returns to the previous network in step 1020.

Although various embodiments of the present invention have been described in detail herein, many variations and modifications may be made without departing from the spirit and scope of the present invention as defined by the appended claims.

What is claimed is:

1. A method of wireless local area communication for a terminal, comprising:
   activating an application. upon detection of an execution event;
   setting a channel number, upon detection of a master start event after application activation;
   generating an identifier containing identification information of the application and the set channel number;
   broadcasting the identifier to external terminals;
   performing a pairing procedure with an external terminal having responded to the broadcast identifier; and
   communicating data related to the application with the paired external terminal.

2. The method of claim 1,
   wherein the identification information comprises an application specific code of the application.

3. The method of claim 1, wherein setting the channel number comprises:
   selecting one entry from a preset range of channel numbers as the channel number.

4. The method of claim 1, wherein setting the channel number comprises:
   searching for an external terminal broadcasting identification information related to the application; and
   selecting, when one or more external terminals broadcasting identification information related to the application are found, the earliest entry of a range of channel numbers except for channel numbers preoccupied by the found external terminals as the channel number for pairing.

5. The method of claim 1, further comprising:
   displaying the set channel number.

6. The method of claim 1, further comprising: setting a password which will also be contained in the identifier, wherein the pairing procedure is performed when a password received from the external terminal is identical to the set password.

7. A method of wireless local area communication for a terminal, comprising:
   activating, upon detection of an execution event associated with an application, the application;
   finding, upon detection of a slave start event after application activation, an identifier containing identification information of the application and a set channel number among multiple received identifiers, wherein the identifier was generated and broadcast by a master terminal which has activated the application;
   sending a pairing request to the master terminal that broadcast the found identifier;
   performing a pairing procedure with the master terminal; and
   communicating data related to the application with the paired master terminal.

8. The method of claim 7, wherein finding the identifier containing the identification information comprises:
   when two or more identifiers containing the identification information are found, notifying a user of the two or more found identifiers.

9. The method of claim 8, wherein finding the identifier containing the identification information further comprises:
   receiving a selection by the user of one of the two or more found identifiers.

10. The method of claim 7, wherein sending the pairing request comprises:
    retrieving a password corresponding to the set channel number from a storage unit; and
    sending the pairing request containing the retrieved password to the master terminal having broadcast the identifier.

11. The method of claim 7, wherein sending the pairing request comprises:
    displaying, when multiple identifiers containing the identification information are found, the multiple identifiers;
    receiving a selection by the user of one of the multiple found identifiers; and
    sending the pairing request to the master terminal that broadcast the identifier selected by the user among the multiple identifiers.

12. A method of wireless local area communication for a terminal, comprising:
    activating an application, upon detection of an execution event associated with the application;
    setting a channel number, upon detection of a master start event after application activation, by selecting one entry from among a preset range of channel numbers;
    generating a first inquiry identifier containing identification information of the application and the set channel number;
    broadcasting the first inquiry identifier;
    when no master terminal responds to the first inquiry identifier:
      setting the first inquiry identifier as an identifier for pairing;
      performing a pairing procedure with an external terminal from which an identifier identical to the identifier set for pairing is received; and
      communicating data related to the application with the paired external terminal; and
    when a master terminal responds to the first inquiry identifier, generating and broadcasting a second inquiry identifier containing the identification information and the next channel number.

13. A terminal comprising:
    a control unit which, upon detection of an execution event associated with an application:
      activates the application;
      sets, upon detection of a master start event after application activation; a channel number; and
      generates an identifier containing identification information of an application and the set channel number; and
    a wireless communication unit which broadcasts, under control of the control unit, the identifier, performs a pairing procedure with an external terminal having responded to the broadcast identifier, and communicates data related to the application with the paired external terminal.

14. The terminal of claim 13, wherein the identification information comprises an application specific code of the application.

15. The terminal of claim 13, wherein the control unit selects one entry from a preset range of channel numbers as the channel number.

16. The terminal of claim 13, wherein the control unit searches for an external terminal broadcasting identification information related to the application, and selects, when one or more external terminals broadcasting identification information related to the application are found, the earliest entry of a range of channel numbers except for channel numbers preoccupied by the found external terminals as the channel number for pairing.

17. The terminal of claim 13, further comprising a display unit displaying the set channel number.

18. A terminal comprising:
a control unit which:
   activates, upon detection of an execution event associated with an application, the application;
   finds, upon detection of a slave start event after application activation, an identifier containing identification information of the application and a set channel number among multiple received identifiers, wherein the identifier was generated and broadcast by a master terminal which has activated the application; and
sends a pairing request to an external terminal having broadcast the found identifier and
a wireless communication unit which, under control of the control unit, receives the multiple identifiers, transmits the pairing request, performs a pairing procedure with the master terminal that broadcast the identifier, and communicates data related to the application with the paired master terminal.

19. The terminal of claim 18, wherein the control unit notifies, when at least one identifier containing the identification information is found, a user of the found identifier.

20. The terminal of claim 18, wherein the control unit, when two or more identifiers containing the identification information are found among multiple identifiers, notifies a user of the two or more found identifiers, and receives a selection by the user of one of the two or more found identifiers, wherein the pairing request is sent to the master terminal that broadcast the selected identifier.

21. A terminal comprising:
a control unit which:
   activates, upon detection of an execution event associated with an application, the application;
   sets, upon detection of a master start event after application activation, a channel number by selecting one entry from among a preset range of channel numbers;
   generates a first inquiry identifier containing the identification information and the set channel number;
   when a master terminal responds to the first inquiry identifier, generates a second inquiry identifier containing the identification information and the next channel number; and
   when no master terminal responds to the first inquiry identifier, sets the first inquiry identifier as an identifier for pairing; and
a wireless communication unit which, under control of the control unit, broadcasts inquiry identifiers, performs a pairing procedure with an external terminal from which an identifier set for pairing is received, and communicates data related to the application with the paired external terminal.

* * * * *